| United States Patent [19] | [11] Patent Number: 4,942,223 |
| Takao et al. | [45] Date of Patent: * Jul. 17, 1990 |

[54] PROCESS FOR SEPARATING A POLYMER FROM A SOLUTION CONTAINING THE SAME

[75] Inventors: Hiroyoshi Takao, Chiba; Yoshio Inoue, Kimitsu; Hirotami Yamazaki, Ichihara, all of Japan

[73] Assignee: Sumitomo Chemical Company Limited, Osaka, Japan

[*] Notice: The portion of the term of this patent subsequent to Oct. 17, 2004 has been disclaimed.

[21] Appl. No.: 530,358

[22] Filed: Sep. 8, 1983

[30] Foreign Application Priority Data

Sep. 14, 1982 [JP] Japan .................. 59-160515

[51] Int. Cl.$^5$ .................... C08F 6/00; C08G 6/00; C08J 3/00
[52] U.S. Cl. .................... 528/501; 528/498
[58] Field of Search .................. 528/501

[56] References Cited

U.S. PATENT DOCUMENTS 2,897,184  7/1959  Kimble et al. ............... 528/501
3,470,070  9/1969  Heckart ..................... 528/501 X
4,319,021  3/1982  Irani .

FOREIGN PATENT DOCUMENTS 2271    6/1979  European Pat. Off. .
59106   9/1982  European Pat. Off. .

*Primary Examiner*—Joseph L. Schofer
*Assistant Examiner*—S. Babajko
*Attorney, Agent, or Firm*—Cushman, Darby & Cushman

[57] ABSTRACT

In order to recover a polymer, such as styrene butadiene copolymer rubber, from a solution obtained by a solution polymerization of the corresponding comonomers, without degradation or deterioration of the polymer, the solution, ordinarily in 3 to 30% by weight concentration, is separated into the solvent and a more concentrated polymer solution of not less than 50% by weight, by heating the solution under a pressure at such a temperature (A) that the polymer does not decompose, heating a solvent, which is preferably the same as that for the solution, at a higher temperature than (A) above under a pressure, and joining the heated solution and the heated solvent in a mixer to convey to a flash evaporator.

16 Claims, 1 Drawing Sheet

F I G. 1
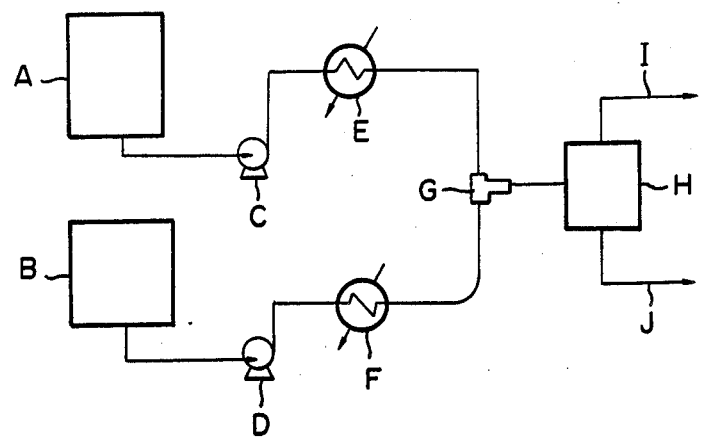
F I G. 2
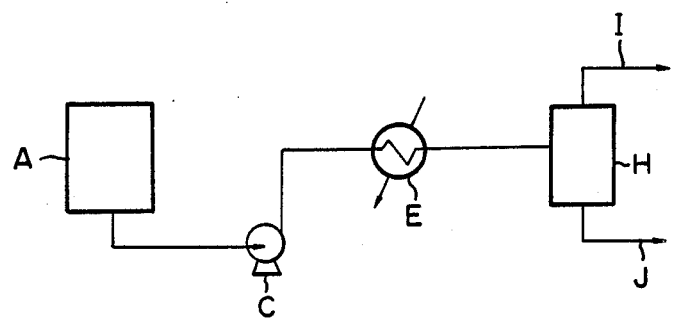

PROCESS FOR SEPARATING A POLYMER FROM A SOLUTION CONTAINING THE SAME

The present invention relates to a process for separating a polymer from a solution containing the same. More particularly, it relates to a process in the step for recovery of a polymer from the polymer solution prepared according to a polymerization method known as so-called solution polymerization. In other words, it relates to a process for the separation and recovery of such polymer by the removal of a hydrocarbon solvent, which is generally used in the method, from the polymer solution. The term "solvent" referred to in the description involves the solvent containing any residual or unaltered monomer.

Generally, the process for the production of polymers according to a solution polymerization embraces a set of apparatus to remove the solvent from the polymer solution prepared in the polymerization apparatus, and, as for the solvent-removing apparatus, various kinds of the mode have so far been employed.

In the case of thermoplastic polymers, generally speaking, there has been a method wherein the polymer mixture is heated by means of various indirect heat-exchanging apparatus, and then the solvent is flash-evaporated in a vessel utilizing the sensible heat. However, when a solution of a polymer having a limited thermally durable temperature, such as styrene-butadiene copolymer, is processed by this method, the polymer tends to degrade during the course of the heating step in an indirect heat-exchanging apparatus, thus yielding a deteriorated product. In order to avoid such degradation of polymer and to avoid blocking in the heat-exchanger, on the other side, the degree of the heating in the heat-exchanger should be limited to a not so high temperature. Thus, the concentration of the polymer after the flash evaporation remains in a comparatively lower level (for example, less than 50% by weight). Accordingly, the method is no more than a preliminary concentration step. These are disadvantages of the conventional process.

This invention is to aim to solve such disadvantages, and pertains to a process in the step to recover a polymer from a solution containing the same, for the separation of the solution into the solvent and a more concentrated polymer solution containing not less than 50% by weight, preferably not less than 80% by weight, of the polymer, which process is characterized by heating the polymer solution at a temperature at which the polymer remains in the thermally stable state; heating a solvent at a temperature higher than the heating temperature for the said polymer solution; and joining the thus heated solution and the thus heated solvent together for a flash evaporation. More particularly, the invention pertains to a process in the step to recover a polymer from a solution containing the same, for the separation of the solution into the solvent and a more concentrated polymer solution containing not less than 50% by weight, preferably not less than 80% by weight, of the polymer, which process is characterized by heating the polymer solution by means of a heat source at a temperature at which the polymer does not degrade, under a pressure sufficient to keep the solution in liquid phase; heating a solvent at a temperature sufficient to give a necessary heat quantity to obtain an objective concentration of the polymer from a mixture with the said solution by a flash evaporation, under a pressure sufficient to keep the solvent in liquid phase; and joining the flows of the thus heated and pressurized polymer solution and the thus heated and pressurized solvent to convey to a flash evaporation step.

According to the present invention, a solution of a polymer having a shorter thermo-durable period of time, in a lower concentration, can be converted into a more concentrated solution of the polymer up to 80% by weight or more, with ease and high efficiency, without deterioration of the polymer quality.

Polymer concentrated is discharged from a flash evaporator, and, if necessary, is then charged to a vent extruder or a mixing dryer wherein a remaining solvent is further vaporized off.

The process of the present invention may suitably be applied to the step of separation and recovery of the polymer from the polymer solution prepared according to a solution polymerization of, for example, polybutadiene rubber, styrene-butadiene copolymer rubbers (SBR and modified SBR), etc.

The present invention will more fully be described with respect to a styrene-butadiene copolymer, which is, however, merely for an example.

Styrene-butadiene copolymers according to a solution polymerization are generally obtained by polymerizing the monomers in a hydrocarbon solvent having 5 to 10 carbons, particularly hexane, heptane, etc., using a lithium catalyst, such as metallic lithium, an alkyllithium, etc. The polymer solution discharged from the solution polymerization vessel is ordinarily of a concentration of 3 to 30% by weight in case of styrene-butadiene copolymers. Such polymer solution may be subjected, according to the necessity, to a filtration or rinsing with water, an acid or an alkali to remove the catalyst, before the heating. The heating is effected under a pressure sufficient to keep the solvent in the polymer solution in the liquid state, in other words, under a pressure higher than the equilibrium pressure displayed by the solvent of the polymer solution and its vapor at the temperature after the joining of the flow with the flow of the heated solvent.

If such pressure is not held, the solvent is the solution is partially increased at the piping, etc. of the heat-exchanger, thus causing unfavorable blockades of the pipings.

In this case, the heat quantity to be given the polymer solution should not exceed the thermally durable temperature which is determined according to the heated period of time and the kind and amount of the stabilizer added. In other words, it should not exceed the upper limit temperature below which the quality of the product would not be deteriorated.

While, the solvent to be joined with the said solution is heated under a pressure higher than the equilibrium pressure displayed by the solvent and its vapor at the heated temperature. In this case, the heat quantity given the solvent is to be sufficient to convert an amount of the solvent to the vapor, which amount means a total solvent in the joined liquid of the heated polymer solution and the heated solvent, eliminated with the solvent accompanying the recovered polymer (namely a more concentrated polymer solution).

In view of the characteristics of the present invention, accordingly, the heating temperature for the solvent is higher than the heating temperature for the polymer solution. Besides, the heating temperature for the solvent depends upon the mixing amount ratio against the polymer solution, and should be higher as the amount ratio is smaller.

The most economical mixing ratio of the solvent is not determined primarily, but it depends upon the thermally durable temperature of the polymer, the kinds of the heating source or heating medium for the solvent, the temperature, the equilibrium vapor pressure of the solvent, and the costs of constructions of heat-exchanger and flash evaporator, as a whole. The solvent to be mixed to the polymer solution according to the present invention may be that which can be a solvent for the polymer. It is the most preferable that the solvent is the same as the one used for the polymer solution, from the viewpoint that the solvent separated finally from the polymer is reused.

The mixing of the heated polymer solution and the heated solvent according to the invention should be conducted while the polymer stays thermally durable. For that purpose, an agitating mixer having a retention time within the thermo-durable period of time may be employed. In the most cases, a well-known mixing device, such as line-mixer and so-called static mixer needing no power, is satisfactorily used in general. The kind of such mixer employed may be decided depending upon the amount ratio of the polymer solution and the solvent, as well as their fluidal characteristics.

The liquid joined in the mixer is then conveyed to a flash evaporator where the liquid is flash-evaporated to separate a polymer solution of a higher concentration and the solvent.

The present invention will be described more concretely with respect to the following Example and the Comparative Example, which are, however, presented merely as examples and not for limitative purpose.

FIG. 1 is a schematic diagram showing the assemblage of apparatus employed in the Example of the present invention. FIG. 2 is a schematic diagram showing the assemblage of apparatus employed in the Comparative Example of the present invention.

EXAMPLE

An experiment for the separation of a polymer solution into the solvent and a more concentrated polymer solution was conducted with the terms as described below. As the results, a more concentrated polymer solution was obtained without deterioration of the polymer.

The samples tested:
  A hexane solution containing 25% by weight of a binary copolymer consisting of 25% by weight of styrene unit and 75% by weight of butadiene unit; and a hexane solvent The apparatus:
  The assemblage of apparatus as shown in FIG. 1 was employed. In the Figure, A is a feeding vessel for the polymer solution; B, a feeding vessel for the solvent; C, a feeding pump for the polymer solution; D, a feeding pump for the solvent; E, a heat exchanger to heat the polymer solution; F, a heat exchanger to heat the solvent; G, a mixer; H, a flash evaporator; I, a flow line for solvent; and J, a flow line for the more concentrated polymer solution.

The essential equipments:
  (1) The mixer
   1 The junction of the hexane solution and the hexane solvent:
    The polymer solution piping (nominal size, $\frac{1}{8}$ inch) was inserted concentrically (60 mm long) into the hexane piping (nominal size, $\frac{1}{2}$ inch).
   2 The line mixer:
    No power loaded. Dimension: nominal size $\frac{1}{2}$ inch, length 144 mm
    Interpositions: six elements, each 24 mm length, twisting 180°.
    Material: SUS-304
  (2) The flash evaporator:
    Consisting of the upper cylindrical portion with 445 mm inner diameter and 650 mm height, and the lower conical portion with 400 mm height and 130 mm bottom diameter, equipped with a heating jacket. Material: SUS-304

The conditions:
  (1) The polymer solution feeding rate; 80 kg/hour
  (2) The polymer solution heating temperature; 150° C. (the heating medium, 10 kg/cm$^2$ Gauge saturated steam)
  (3) The hexane feeding rate; 53 kg/hour
  (4) The hexane heating temperature; 236° C.
  (5) The temperature at the junction of the polymer solution and the hexane solvent; 192° C.
  (6) The pressure in the flash evaporator; 0.5 kg/cm$^2$ Gauge
  (7) The flash evaporator jacket temperature; 140° C.

The results:
  A more concentrated polymer solution containing 85% by weight of the polymer was obtained constantly. The polymer was not thermally degraded, keeping the quality unaltered.

COMPARATIVE EXAMPLE

An experiment for the separation of a polymer solution was conducted with the terms which are deviated from the characteristics of the present invention, as described below. As the results, the experiment had to be discontinued, due to the thermal degradation of the polymer.

The sample tested:
  A hexane solution containing 15% by weight of the polymer having the constitution as described in the Example.

The apparatus:
  The assemblage of apparatus as shown in FIG. 2 was employed. In the Figure, A is a feeding vessel for the polymer solution; C, a feeding pump for the polymer solution; E, a heat exchanger to heat the polymer solution; H, a flash evaporator; I, a flow line for solvent; and J, a flow line for a more concentrated polymer solution.

The flash evaporator is the same as that used in the Example above.

The conditions:
  (1) The polymer solution feeding rate; 133 kg/hour
  (2) The polymer solution heating temperature; 192° C. (the heating medium, 220° C. oil)
  (3) The pressure in the flash evaporator; 0.5 kg/cm$^2$ Gauge
  (4) The flash evaporator jacket temperature; 140° C.

The results:
  The experiment could not be continued, because of the increased flow resistance in the heat exchanger to heat the polymer solution.
  Teardown and inspection of the apparatus revealed that the polymer solution in the heat exchanger and its downstream piping had been thermally degraded, thus the polymer being deteriorated.

We claim:

1. In the step to recover a polymer from a solution containing below 50% the same, a process for separating the solution into the solvent and a more concentrated polymer solution containing not less than 50% by weight of the polymer, which process is characterized by heating the polymer solution at a temperature at which the polymer remains in the thermally stable state; heating a solvent containing none of the polymer at a temperature higher than the heating temperature for the said polymer solution; and joining the thus heated solution and the thus heated solvent, both in liquid state, together for a flash evaporation.

2. In the step to recover a polymer from a solution containing below 50% the same, a process for separating the solution into the solvent and a more concentrated polymer solution containing not less than 50% by weight of the polymer, which process is characterized by heating the polymer solution by means of a heat source at a temperature at which the polymer does not degrade, under a pressure sufficient to keep the solution in liquid phase; heating a solvent containing none of the polymer at a temperature higher than the heating temperature for the said polymer solution and sufficient to give a necessary heat quantity to obtain an objective concentration of the mixture from a mixture with the said solution by a flash evaporation, under a pressure sufficient to keep the solvent in liquid phase; and joining the flows of the thus heated and pressurized polymer solution and the thus heated pressurized solvent, both in liquid state, to convey to a flash evaporation step.

3. A process according to claim 1, wherein the more concentrated polymer solution separated contains not less than 80% by weight of the polymer.

4. A process according to claim 1 wherein the solvent to be mixed to the polymer solution is the same as the one used for the polymer solution.

5. A process according to claim 1 wherein the polymer is a styrene-butadiene copolymer rubber.

6. A process according to claim 2 wherein the more concentrated polymer solution separated contains not less than 80% by weight of the polymer.

7. A process according to claim 6 wherein the solvent to be mixed to the polymer solution is the same as the one used for the polymer solution.

8. A process according to claim 3 wherein the solvent to be mixed to the polymer solution is the same as the one used for the polymer solution.

9. A process according to claim 2 wherein the solvent to be mixed to the polymer solution is the same as the one used for the polymer solution.

10. A process according to claim 9 wherein the polymer is a styrene-butadiene copolymer rubber.

11. A process according to claim 8 wherein the polymer is a styrene-butadiene copolymer rubber.

12. A process according to claim 7 wherein the polymer is a styrene-butadiene copolymer rubber.

13. A process according to claim 6 wherein the polymer is a styrene-butadiene copolymer rubber.

14. A process according to claim 4 wherein the polymer is a styrene-butadiene copolymer rubber.

15. A process according to claim 3 wherein the polymer is a styrene-butadiene copolymer rubber.

16. A process according to claim 2 wherein the polymer is a styrene-butadiene copolymer rubber.

* * * * *